J. W. DAVIDSON.
Grain Drill.

No. 77,802.

Patented May 12, 1868.

Witnesses:
Theo Tusche
Wm. Trewen

Inventor,
J. W. Davidson
Per Murray & Co.
Attorneys

United States Patent Office.

JAMES W. DAVIDSON, OF MOUNT AUBURN, ILLINOIS.

Letters Patent No. 77,802, dated May 12, 1868.

IMPROVEMENT IN WHEAT-DRILL.

*The Schedule referred to in these Letters Patent and making part of the same.*

TO ALL WHOM IT MAY CONCERN:

Be it known that I, JAMES W. DAVIDSON, of Mount Auburn, in the county of Christian, and State of Illinois, have invented a new and useful Improvement in Wheat-Drill; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved machine for sowing wheat or other grain in drills, which shall be convenient and accurate in operation, and which shall cover the grain at a sufficient depth beneath the surface of the ground to protect it from the winter; and it consists in the construction and combination of the various parts of the machine, as hereinafter more fully described.

Figure 1:
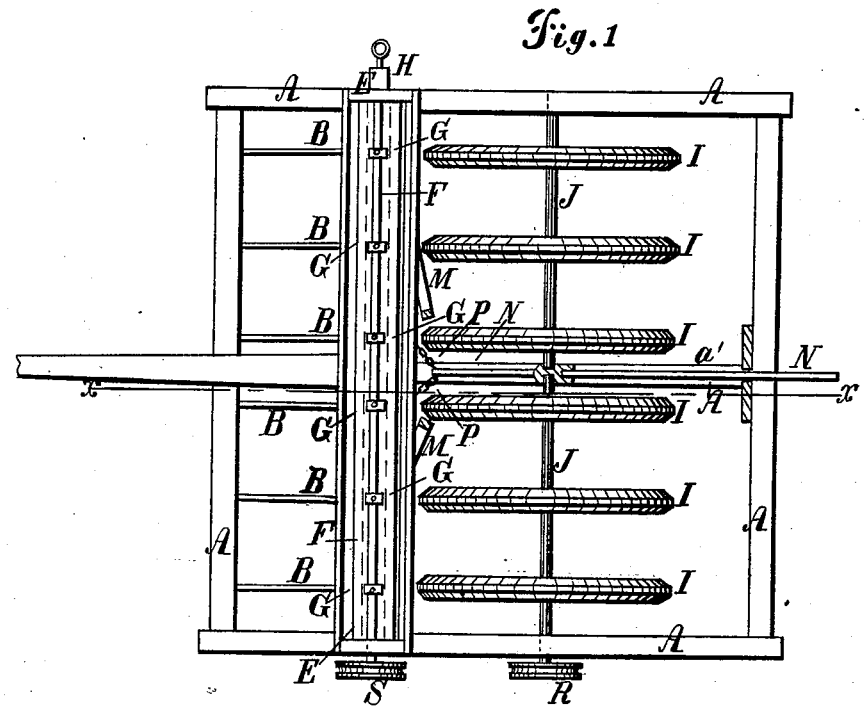
Figure 1 is a top or plan view of my improved machine, parts being broken away to show the construction.

A is the frame of the machine, which I prefer to make six feet long and five feet four inches wide, inside measurement. The frame A is made with a central longitudinal beam, $a'$, as shown in fig. 1.

Figure 2:
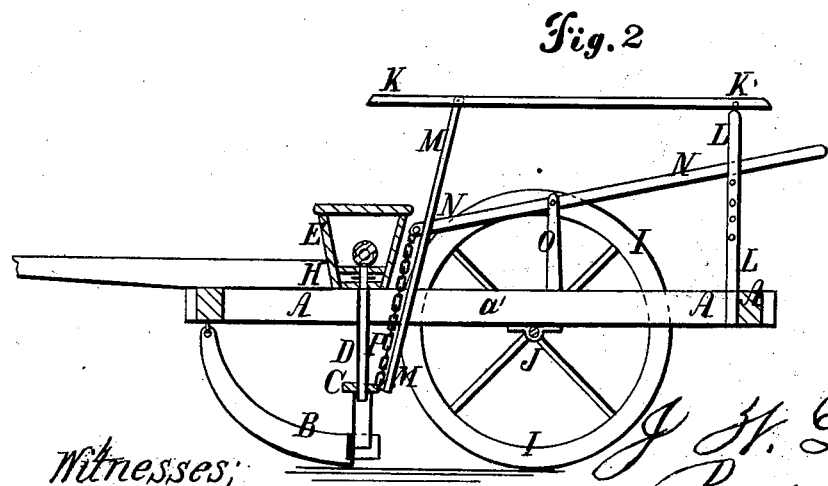
Figure 2 is a detail sectional view of the same, taken through the line $x\,x$, fig. 1.

B is a series of runners, the forward ends of which are pivoted or hinged to the front cross-bar of the frame A, at a proper distance apart, as shown in fig. 2, and their rear ends are connected to each other, and held in their proper relative positions by being securely attached to a cross-bar, C, as shown in fig. 2.

The rear ends of the runners are divided, or have short tubes formed in or attached to them for the reception of the free ends of the flexible tubes, D, that guide the seed from the seed-box E to the rear parts of the runners B, where it enters the ground.

The seed-box E extends entirely across the frame A, to which it is securely attached, and has a shaft, F, extending through it from end to end.

G is a series of wheels or rollers, equal in number to the runners B, and four inches in diameter, which are attached to the shaft F, directly above the holes in the bottom of the seed-box, at the lower orifices of which the upper ends of the flexible tubes, D, are attached to the bottom of said seed-box.

The wheels G have holes or recesses formed in their faces, which receive the seed, and carry it to the holes in the bottom of the box E, through which it passes on its way to the ground.

The amount of seed passing through the holes in the bottom of the seed-box E is regulated by the slide-bar H, which passes longitudinally through the seed-box E, between the parts of its double bottom, as shown in fig. 2, and which has holes through it corresponding in position to the holes through the bottom of the box E, so that by moving the said bar a little in one or the other direction, the size of the discharging-orifices may be adjusted at pleasure.

I are wheels, which are attached to two shafts, J, in such positions as to be directly behind the runners B, as shown in fig. 1.

The faces of the wheels I are made in the shape shown in fig. 1; that is to say, the central parts of the faces of said wheels, for about an inch in width, are flat, and they then incline outward, as shown, so as to press the grain three or four inches into the ground, to protect it from being killed during the winter. For this purpose the wheels I should each be from sixty to eighty pounds in weight.

The outer ends of the shafts J revolve in bearings in the side bars of the frame A, and their inner ends revolve in bearings in the central bar, $a'$, of said frame.

This construction is for convenience in turning, one half the wheels, in turning, revolving backwards, and the other half forwards.

R is a pulley, attached to the projecting end of the shaft J, around which, and around the pulley S, attached to the projecting end of the shaft F, passes a band, so that the dropping-device may be operated by the advance of the machine.

K is the driver's seat, the rear end of which is supported by and pivoted to the support L, the lower end of which is attached to the frame A.

The forward end of the seat K is supported by the bars M, the upper ends of which are pivoted to the said seat, and their lower ends are attached to the bar C, so that the driver, by sitting upon the forward part of the seat K, may throw his weight upon the runners B, and by sitting upon the rear part of said seat, he may throw his weight upon the wheels I.

N is a lever, pivoted to the upper end of the support O, the lower end of which is attached to the central bar, $a'$, of the frame A.

The forward end of the lever N is connected by one or more chains P, or equivalent connections, to the cross-bar C, so that the depth at which the runners B work may be regulated by adjusting the position of the lever N.

The rear end of the lever N passes through a slot in the support L, and may be held in any position in which it is placed, by a pin passed through one or other of the holes formed for it in the said support L. The lever N also enables the runners B to be raised above the ground for convenience in turning or passing from place to place.

I claim as new, and desire to secure by Letters Patent—

1. The seat K, when its forward end is supported upon the adjustable cross-bar C, carrying the seed-tubes by the bars M, all arranged as described, for the purpose specified.

2. The adjustable shoes B, when provided with short vertical tubes at their rear ends to receive the flexible tubes D, said shoes being held in place and connected to each other by means of the cross-bar C secured to the short tubes, all arranged as described, for the purpose specified.

The above specification of my invention signed by me, this 4th day of September, 1867.

JAMES W. DAVIDSON.

Witnesses:
   H. F. DAVIDSON,
   WM. E. PETTUS.